(12) United States Patent
Lai

(10) Patent No.: US 9,106,818 B2
(45) Date of Patent: Aug. 11, 2015

(54) DISPLAY DEVICE WITH CAMERA AND TRANSMISSION UNIT FOR AUTOMATICALLY ADJUSTING CAMERA ANGLE

(71) Applicant: HON HAI PRECISION INDUSTRY CO., LTD., New Taipei (TW)

(72) Inventor: Cheng-Yi Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 38 days.

(21) Appl. No.: 14/060,730

(22) Filed: Oct. 23, 2013

(65) Prior Publication Data

US 2015/0070572 A1 Mar. 12, 2015

(30) Foreign Application Priority Data

Sep. 6, 2013 (TW) .............................. 102132317 U

(51) Int. Cl.
*H04N 5/225* (2006.01)

(52) U.S. Cl.
CPC ........... *H04N 5/2252* (2013.01); *H04N 5/2251* (2013.01); *H04N 5/2257* (2013.01)

(58) Field of Classification Search
CPC ... H04N 5/225; H04N 5/2251; H04N 5/2252; H04N 5/2253; H04N 5/2254; H04N 5/2257; H04N 5/2259; H04N 1/00127; H04N 1/00129; H04N 1/00283; H04N 7/142; H04N 7/144; H04N 7/15; G09G 5/003; G09G 2354/00; F16D 3/00; F16D 3/02; F16D 3/10; F16D 3/72
USPC ................................................. 348/373–376
See application file for complete search history.

(56) References Cited

U.S. PATENT DOCUMENTS

| | | | | |
|---|---|---|---|---|
| 7,593,031 B2 * | 9/2009 | Root et al. | ................. | 348/14.07 |
| 8,089,238 B2 * | 1/2012 | Wang et al. | ................... | 318/685 |
| 8,317,415 B2 * | 11/2012 | Chang | ............................ | 396/428 |
| 2001/0046915 A1 | 11/2001 | Green et al. | | |
| 2005/0050686 A1 * | 3/2005 | Kurokawa | ........................ | 16/354 |
| 2010/0020182 A1 * | 1/2010 | Wang et al. | ................ | 348/207.1 |
| 2012/0146906 A1 * | 6/2012 | Song | .............................. | 345/158 |
| 2013/0064537 A1 * | 3/2013 | Kao et al. | ....................... | 396/428 |
| 2013/0169528 A1 * | 7/2013 | Jung et al. | ...................... | 345/156 |
| 2013/0169740 A1 * | 7/2013 | Lee et al. | ................... | 348/14.05 |
| 2013/0258180 A1 * | 10/2013 | Yu | ................................. | 348/373 |

FOREIGN PATENT DOCUMENTS

CN 022310053 1/2003

* cited by examiner

*Primary Examiner* — Pritham Prabhakher
(74) *Attorney, Agent, or Firm* — Novak Druce Connolly Bove + Quigg LLP

(57) ABSTRACT

An exemplary display device includes a display housing, a camera, a bracket and a transmission unit connected between the camera and the bracket. The transmission unit includes a camera rotation unit, a bracket rotation unit and a linkage unit. The camera rotation unit is fixed on the display housing and connected with the camera. The bracket rotation unit is fixed on the display housing and rotatably connected with the bracket. The linkage unit interconnects the camera rotation unit and the bracket rotation unit. When the display housing is rotated, the bracket rotation unit rotates in unison with the display housing relative to the bracket, the bracket rotation unit drives the camera rotation unit to rotate via the linkage unit, and the camera rotation unit drives the camera to rotate thereby adjusting an angle of the camera relative to the display housing.

16 Claims, 8 Drawing Sheets

DISPLAY DEVICE WITH CAMERA AND TRANSMISSION UNIT FOR AUTOMATICALLY ADJUSTING CAMERA ANGLE

BACKGROUND

1. Technical Field

The present disclosure relates to a display device with a camera and a transmission unit, wherein the transmission unit imparts motion to the camera upon pivoting of a housing of the display device by a user.

2. Description of Related Art

A typical display device includes a display screen, and a camera mounted on a top end of the display screen in order to conveniently achieve video chatting. Generally, the display screen is rotatably connected with a bracket, so that users can rotate the display screen relative to the bracket to adjust an angle of the display screen. However, the rotation of the display screen often causes a change of an angle of the camera relative to the bracket. In order to return the camera to the original angle, a user needs to rotate the camera manually, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
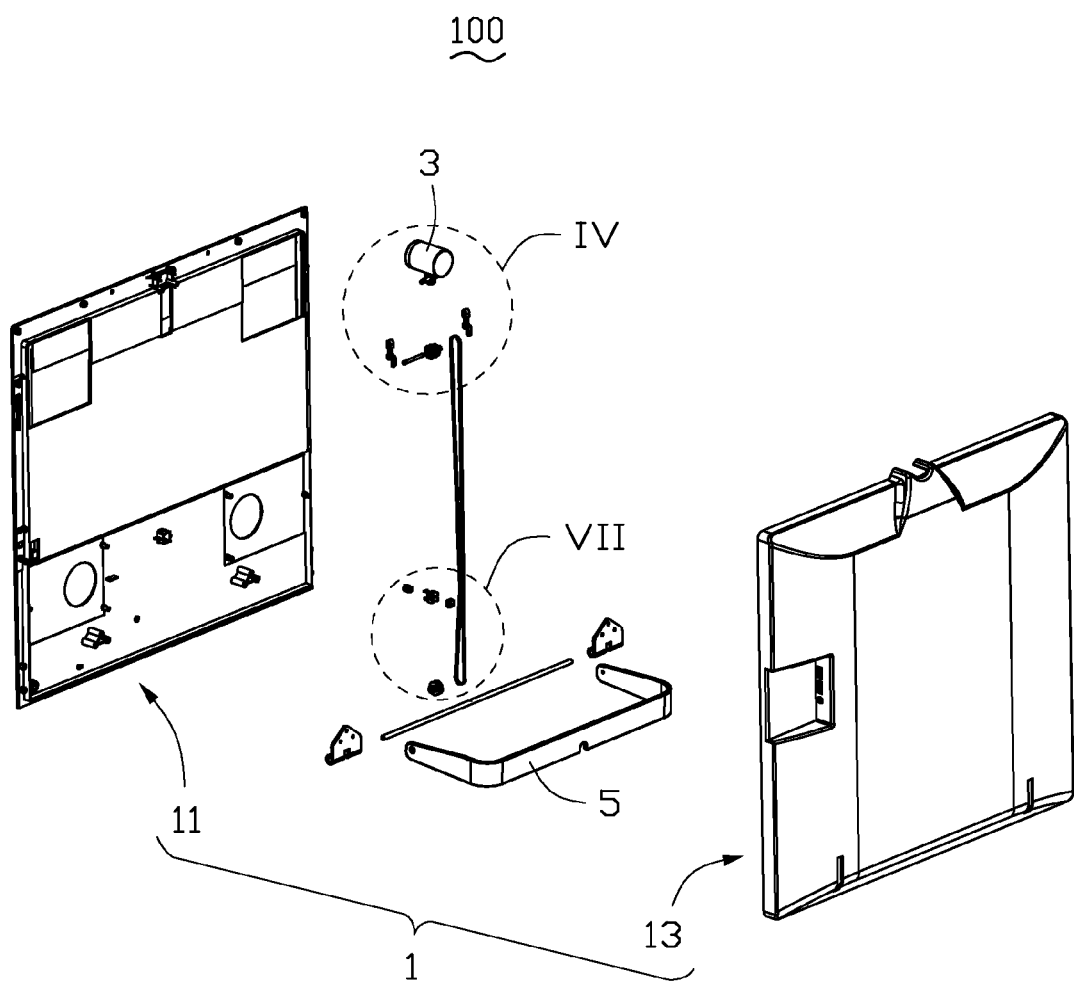
FIG. 1 is an exploded, perspective view of a display device according to an exemplary embodiment of the disclosure.

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one."

Figure 2:
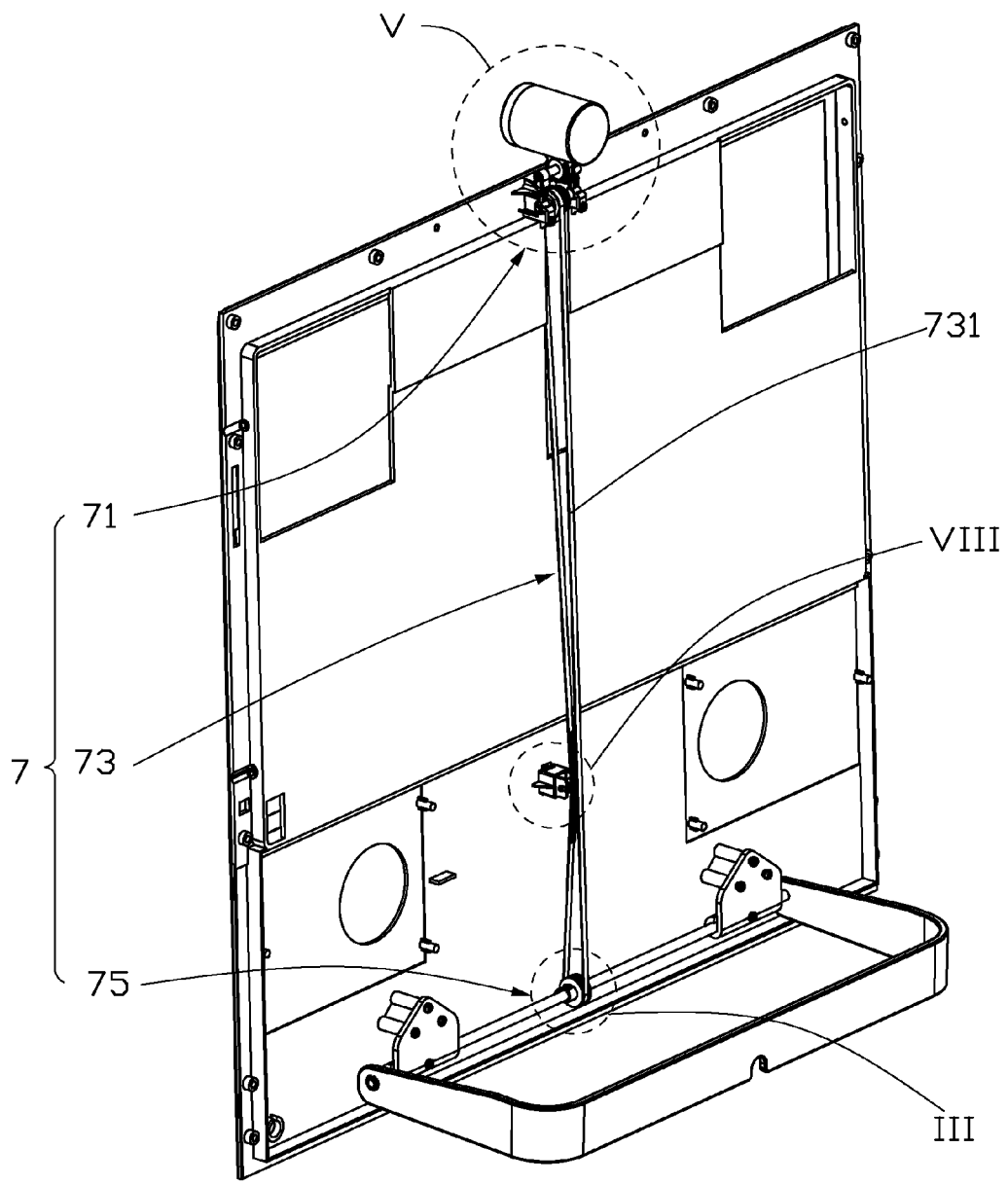
FIG. 2 is an assembled view of the display device of FIG. 1, but omitting a back panel thereof.

FIGS. 1 and 2 are perspective views of aspects of a display device 100 according to an exemplary embodiment. The display device 100 comprises a display housing 1, a camera 3, a bracket 5, a transmission unit 7, and a tension assembly 9. The display housing 1 comprises a front panel 11 and a back panel 13. The transmission unit 7 is fixed on a surface of the front panel 11 facing toward the back panel 13. After the front panel 11 and the back panel 13 are assembled together, the transmission unit 7 is received in the display housing 1. The front panel 11 includes a display (not labeled) of the display device 100.

The transmission unit 7 comprises a camera rotation unit 71, a bracket rotation unit 75, and a linkage unit 73. The camera rotation unit 71 is fixed to the top end of the front panel 11. The camera 3 connects with the camera rotation unit 71. The bracket rotation unit 75 is rotatably connected to the bottom end of the front panel 11. The camera rotation unit 71 connects to the bracket rotation unit 75 by the linkage unit 73 to achieve synchronous rotation of the camera rotation unit 71 and the bracket rotation unit 75 (see below for details).

Figure 3:
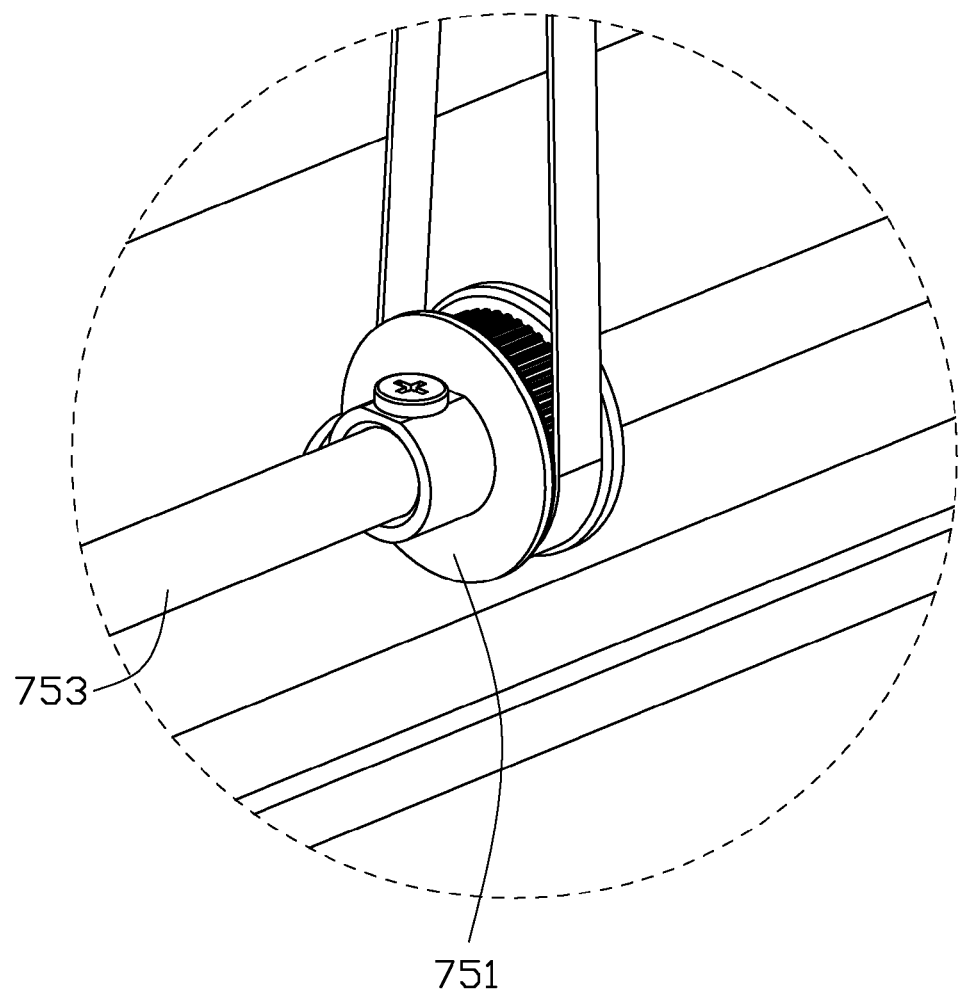
FIG. 3 is an enlarged view of a circled portion III of FIG. 2.

FIG. 3 shows that the bracket rotation unit 75 comprises a bracket shaft 753 and a bracket gear 751. The bracket gear 751 is fixed on the bracket shaft 753 in order to synchronously rotate with the bracket shaft 753. In the embodiment, the bracket gear 751 is fixed on the bracket shaft 753 by a bolt. The bracket shaft 753 is fixed to the bottom end of the front panel 11, so that the bracket shaft 753 rotates with the front panel 11 synchronously. The bracket 5 is rotatably mounted on the bracket shaft 753, so that the angle of the front panel 11 can be adjusted. That is, the combined front panel 11 and bracket shaft 753 is rotated, with the bracket shaft 753 pivoting relative to the bracket 5.

FIG. 2 shows that the linkage unit 73 includes a drive belt 731, which is provided with a plurality of transmission teeth. The drive belt 731 is wound around the bracket gear 751 and the camera rotation unit 71 so that rotation of the bracket shaft 753 is transmitted to the camera rotation unit 71. Thus, the bracket shaft 753 and the camera rotation unit 71 rotate synchronously.

Figure 4:
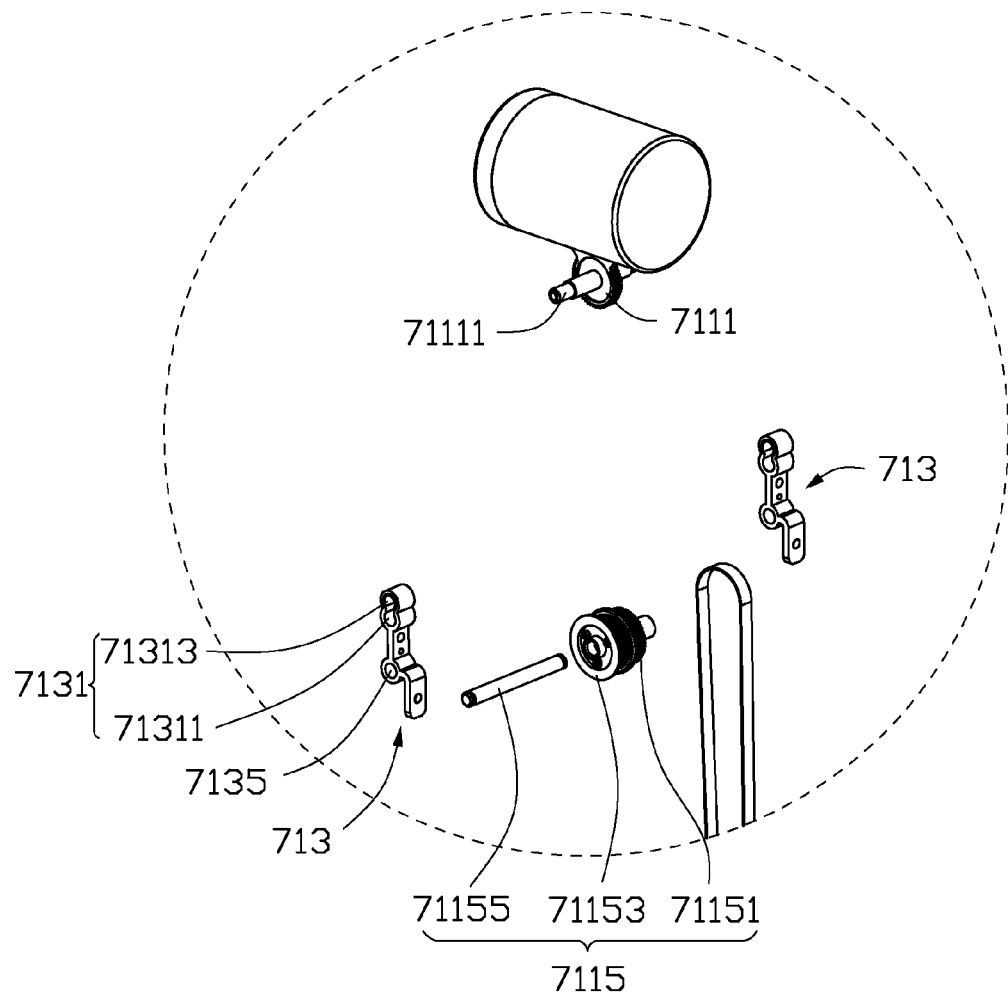
FIG. 4 is an enlarged view of a circled portion IV of FIG. 1.
Figure 5:
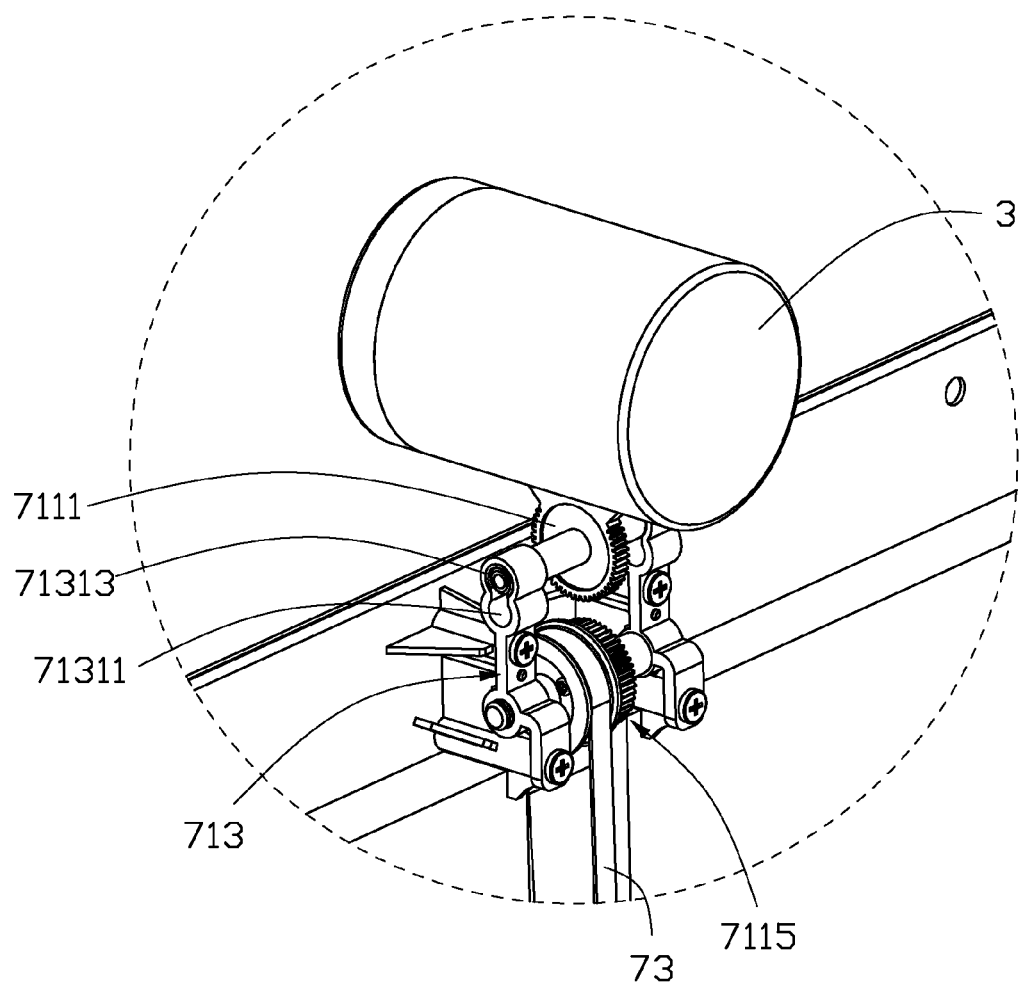
FIG. 5 is an enlarged view of a circled portion V of FIG. 2, showing a camera gear of a camera separate from a first gear of a transmission gear group.

FIGS. 4 and 5 show that the camera rotation unit 71 comprises a supporter 713 and a camera gear group 711. The supporter 713 is secured to the top end of the front panel 11. The camera gear group 711 comprises a camera gear 7111 and a transmission gear group 7115. The camera gear 7111 is a toothed gear, and is fixed to a housing of the camera 3. In one embodiment, the camera gear 7111 and the camera 3 are fabricated as one whole body. That is, the camera gear 7111 and the camera 3 are portions of a single monolithic body of material, such as metal or plastic. Furthermore, the camera gear 7111 is mounted on a camera shaft 71111. In the embodiment, the camera shaft 71111, the camera gear 7111 and the camera 3 are fabricated as one whole body. That is, the camera shaft 71111, the camera gear 7111 and the camera 3 are portions of a single monolithic body of material, such as metal or plastic.

Figure 6:
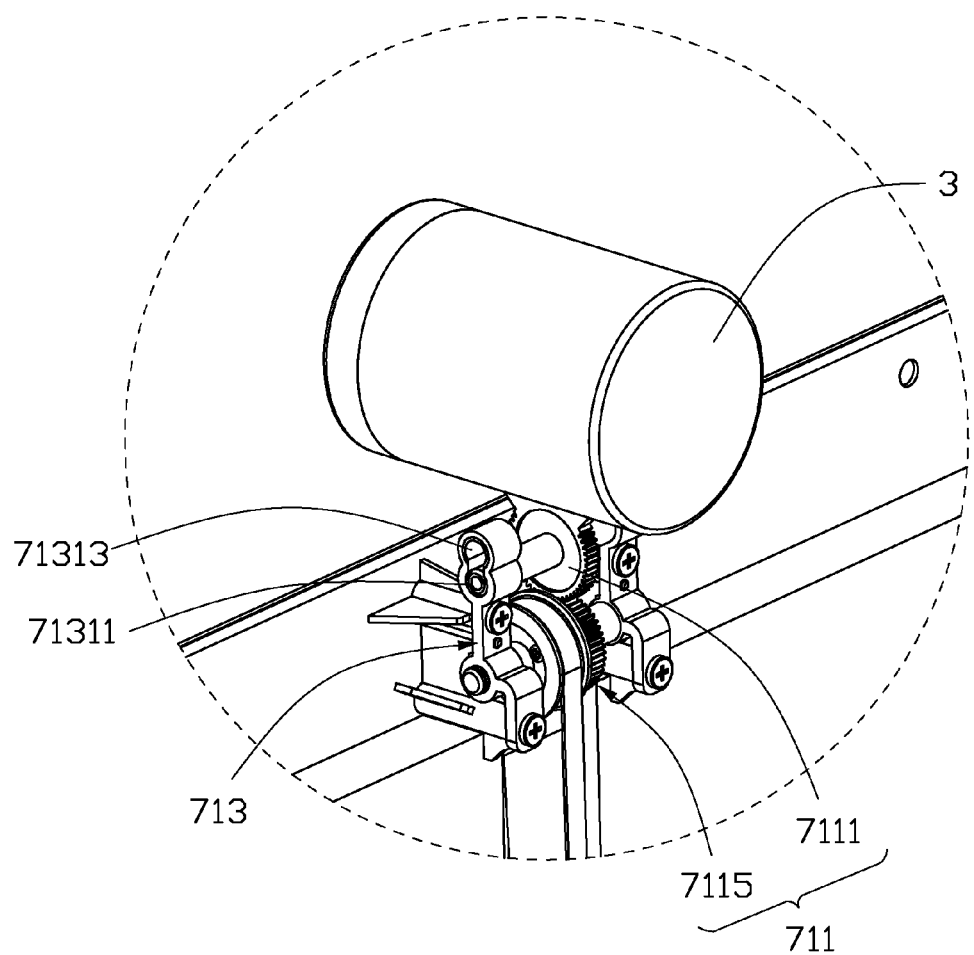
FIG. 6 is similar to FIG. 5, but showing the camera gear meshed with the first gear.

The supporter 713 comprises two support bodies, and each support body includes a plurality of through holes. The front panel 11 includes a plurality of threaded holes aligned with the plurality of through holes of the supporter 713, respectively. Bolts pass through the plurality of through holes and are screwed into the corresponding threaded holes to secure the supporter 713 to the top end of the front panel 11. Each support body defines a camera shaft dual hole 7131 and a transmission shaft hole 7135, wherein the camera shaft dual hole 7131 is located above the transmission shaft hole 7135. The camera shaft dual hole 7131 comprises a smooth shaft hole 71311 and a damping shaft hole 71313. The damping shaft hole 71313 is located above the smooth shaft hole 71311 and communicates with the smooth shaft hole 71311. The camera shaft 71111 is rotatably received in the smooth shaft hole 71311 or the damping shaft hole 71313, as selected by a user. The camera shaft 71111 can be moved from the smooth shaft hole 71311 to the damping shaft hole 71313 or vice versa by applying a force on the camera shaft 71111. In the embodiment, a diameter of the damping shaft hole 71313 is smaller than a diameter of the smooth shaft hole 71311. Thus, when the camera shaft 71111 is received in the damping shaft hole 71313, friction between a wall of the damping shaft hole 71313 and the camera shaft 71111 can hold the camera shaft 71111 in a given position. In addition, the camera shaft 71111 can be rotated in the damping shaft hole 71313 by an applied external force when the external force is large enough to overcome the friction. Thereby, an angle of the camera 3 can be adjusted. When the camera shaft 71111 is received in the smooth shaft hole 71311, the camera shaft 71111 is free to rotate in the smooth shaft hole 71311, as shown in FIG. 6.

The transmission gear group 7115 comprises a first gear 71151 and a second gear 71153. The first gear 71151 is a toothed gear, and includes a plurality of through holes. The second gear 71153 includes a plurality of threaded holes. Bolts pass through the plurality of through holes of the first gear 71151 and are screwed into the plurality of the threaded holes of the second gear 71153, so that the first gear 71151 and the second gear 71153 are connected together and rotate synchronously. Each of the first gear 71151 and the second gear 71153 also includes a central hole. In the embodiment, the first gear 71151 and the second gear 71153 are fixedly mounted on a transmission shaft 71155, with the transmission shaft 71155 passing through and interference fitted in the central holes. Alternatively, the first gear 71151 and the transmission shaft 71155 are fabricated as one whole body. In such case, the transmission shaft 71155 passes through the central hole of the second gear 71153, and the first gear 71151 and second gear 71153 are connected together by bolts.

In assembly of the transmission unit 7, the drive belt 731 is wound around the second gear 71153 and the bracket gear 751. When the camera shaft 71111 is received in the smooth shaft hole 71313, the camera gear 7111 meshes with the first gear 71151. In this condition, when the front panel 11 is turned clockwise (i.e. in a clockwise direction) relative to the bracket 5, the bracket shaft 753 and the bracket gear 751 are both turned clockwise in unison with the front panel 11, thereby driving both the second gear 71153 and the first gear 71151 to rotate clockwise. Thus the camera gear 7111 meshed with the first gear 71151 is turned counterclockwise (i.e. in a counterclockwise direction), so that the camera 3 fixed with the camera gear 7111 is rotated counterclockwise to keep the angle of the camera 3 relative to a viewer (user) of the front panel 11 unchanged. Likewise, when the front panel 11 is turned counterclockwise relative to the bracket 5, the bracket shaft 753 and the bracket gear 751 that is fixedly mounted on the bracket shaft 753 are both turned counterclockwise in unison with the front panel 11, thereby driving both the second gear 71153 and the first gear 71151 to rotate counterclockwise. Thus the camera gear 7111 meshed with the first gear 71151 is turned clockwise, so that the camera 3 fixed with the camera gear 7111 is rotated clockwise to maintain the angle of the camera 3 relative to a viewer of the front panel 11 unchanged. When the camera shaft 71111 is received in the damping shaft hole 71311, the camera gear 7111 is disengaged from the first gear 71151. In this condition, a user can rotate the camera 3 and position the camera 3 at a desired angle, through the frictional engagement of the camera shaft 71111 with the wall of the damping shaft hole 71311.

Figure 7:
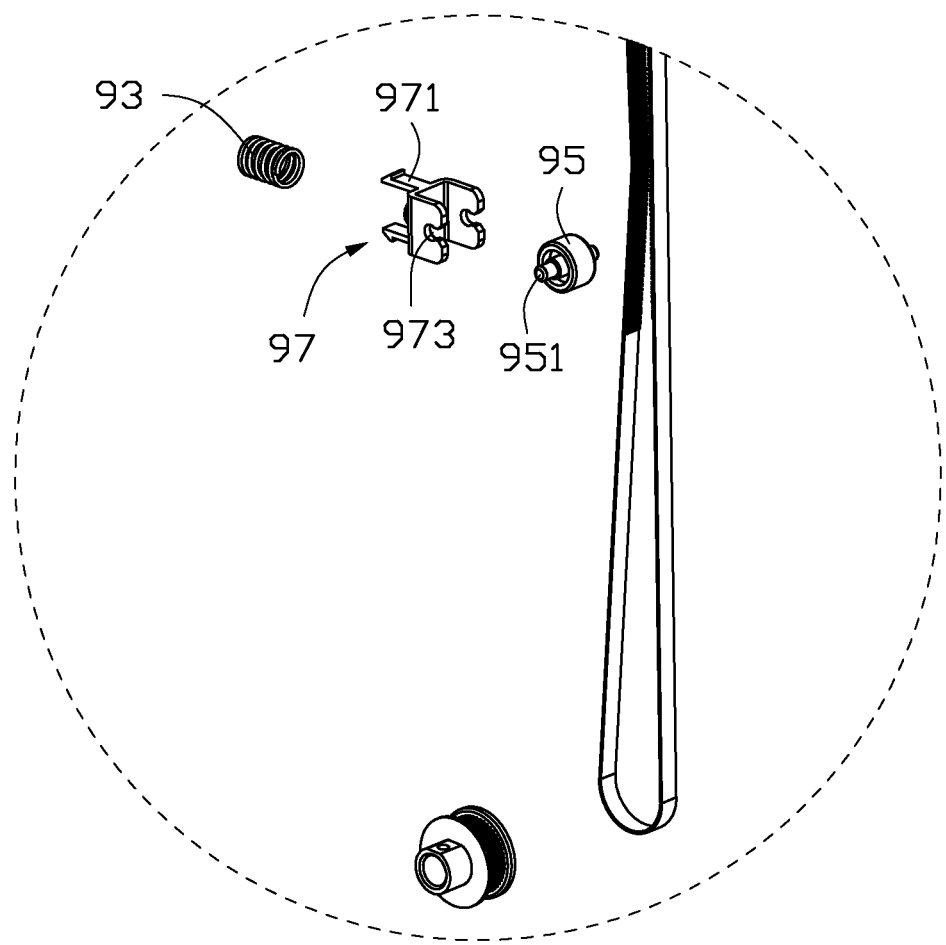
FIG. 7 is an enlarged view of a circled portion VII of FIG. 1.
Figure 8:
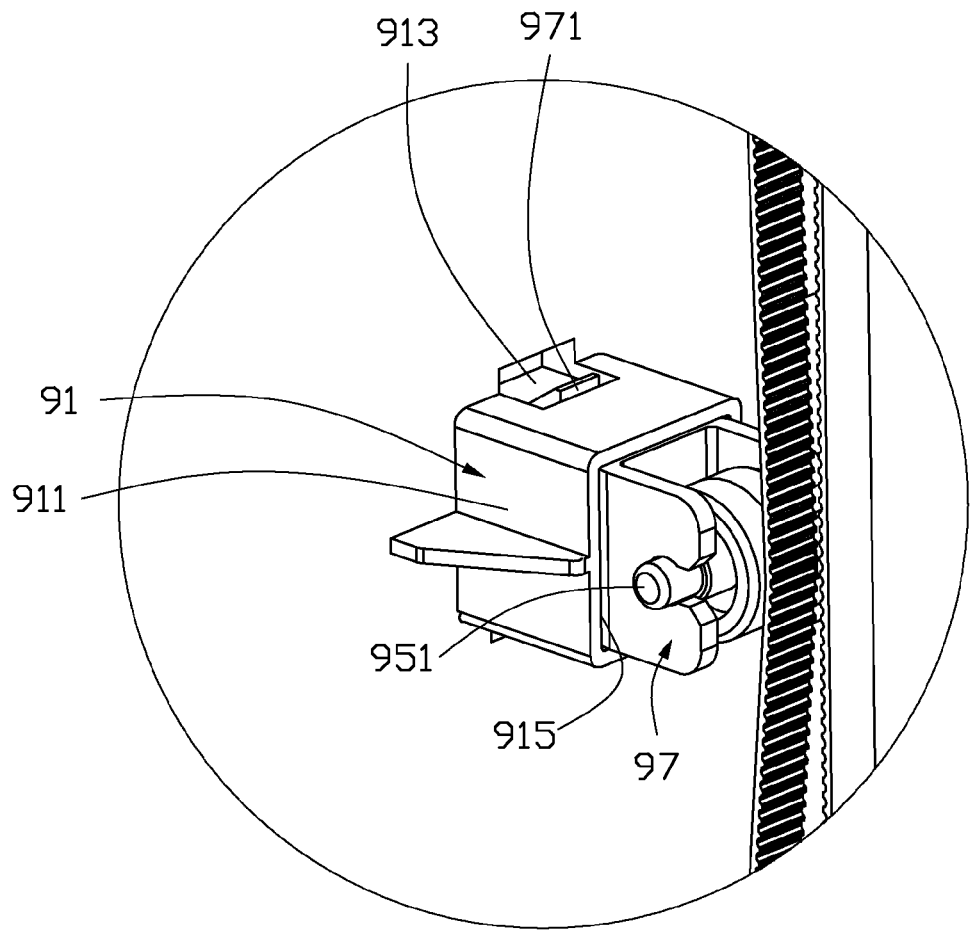
FIG. 8 is an enlarged view of a circled portion VIII of FIG. 2.

FIGS. 2, 7 and 8 show that the tension assembly 9 comprises a holder 91, a spring 93, a belt tensioning pulley 95, and a tensioner arm 97. The holder 91 comprises four sidewalls 911, which are fixed to the front panel 11 and cooperatively form a rectangular frame. The four sidewalls 911 and the front panel 11 cooperatively define a receiving space 915 therebetween. Each of an upper one of the sidewalls 911 and a lower one of the sidewalls 911 is provided with a groove 913. A pair of hooks 971 is located on a first end of the tensioner arm 97, and a pair of aligned shaft holes 973 is defined in a bifurcated second end of the tensioner arm 97. The belt tensioning pulley 95 is rotatably mounted on a belt tensioning pulley shaft 951, which in turn is received and fixed in the shaft holes 973.

In assembly of the tension assembly 9, the belt tensioning pulley 95 is mounted on the tensioner arm 97 such that it is adjacent to the drive belt 731. The hooks 971 of the tensioner arm 97 are inserted into the receiving space 915, and are slidably engaged in the grooves 913 of the holder 91. The spring 93 is received in the receiving space 915. A first end of the spring 93 is attached to the front panel 11, and a second end of the spring 93 is attached to the tensioner arm 97, and thereby the belt tensioning pulley 95 holds the drive belt 731. With the above-described structure, the belt tensioning pulley 95 exerts a force on the drive belt 731 to increase the tension on the drive belt 731.

Although various features and elements are described as embodiments in particular combinations, each feature or element can be used alone or in other various combinations within the principles of the present disclosure to the full extent indicated by the broad general meaning of the terms in which the appended claims are expressed.

What is claimed is:

1. A display device comprising:
   a display housing;
   a camera located on the display housing;
   a bracket; and
   a transmission unit connected between the camera and the bracket, the transmission unit comprising:
      a camera rotation unit fixed on the display housing and connected with the camera;
      a bracket rotation unit fixed on the display housing and rotatably connected with the bracket; and
      a linkage unit interconnecting the camera rotation unit and the bracket rotation unit;
   wherein when the display housing is rotated, the bracket rotation unit rotates in unison with the display housing relative to the bracket, the bracket rotation unit drives the camera rotation unit to rotate via the linkage unit, and the camera rotation unit drives the camera to rotate thereby adjusting an angle of the camera relative to the display housing;
   wherein the camera rotation unit comprises a supporter and a camera gear group, the supporter is fixed on the display housing, and the camera gear group interconnects the camera and the linkage unit; and
   wherein the camera gear group comprises a toothed camera gear fixed to the camera and a transmission gear group, the supporter comprises a camera shaft dual hole and a transmission shaft hole, the toothed camera gear comprises a camera shaft received in the camera shaft dual hole, and the transmission gear group comprises a transmission shaft rotatably received in the transmission shaft hole.

2. The display device of claim 1, wherein the camera, the toothed camera gear and the camera shaft are fabricated as one whole body, the transmission gear group comprises a toothed first gear and a second gear, the toothed first gear and the second gear are mounted on the transmission shaft such that the toothed first gear and the second gear are rotatable synchronously, the toothed first gear is meshable with the toothed camera gear, and the second gear connects with the linkage unit.

3. The display device of claim 2, wherein the toothed first gear and the second gear are connected together by bolts.

4. The display device of claim 2, wherein the toothed first gear and the transmission shaft are fabricated as one whole body.

5. The display device of claim 2, wherein the camera shaft dual hole comprises a smooth shaft hole and a damping shaft hole, the smooth shaft hole is located below and communicates with the damping shaft hole, and the camera shaft is selectively receivable in either the smooth shaft hole or the damping shaft hole; and when the camera shaft is received in the smooth shaft hole, the toothed camera gear meshes with the toothed first gear and the camera shaft is rotatable in the smooth shaft hole; and when the camera shaft is received in the damping shaft hole, the toothed camera gear is disengaged from the toothed first gear and the camera shaft is held in position in the damping shaft hole by friction.

6. The display device of claim 5, wherein a diameter of the damping shaft hole is smaller than a diameter of the smooth shaft hole.

7. The display device of claim 5, wherein when the camera shaft is received in the damping shaft hole, the camera shaft is rotatable in the damping shaft hole by applying external force on the camera to overcome the friction, and thereby an angle of the camera relative to the display housing is manually adjustable.

8. The display device of claim 1, wherein the linkage unit comprises a drive belt, the drive belt is provided with a plurality of transmission teeth, and the drive belt is connected to the camera rotation unit and the bracket rotation unit such that the camera rotation unit and the bracket rotation unit are synchronously rotatable.

9. The display device of claim 1, wherein the bracket rotation unit comprises a bracket shaft and a bracket gear, the bracket gear is fixed on the bracket shaft, and the bracket gear connects with the linkage unit.

10. The display device of claim 1, further comprising a tension assembly which increases tension on the linkage unit, wherein the tension assembly is located between the display screen and the linkage unit.

11. The display device of claim 10, wherein the tension assembly comprises a holder, a spring, a belt tensioning pulley and a tensioner arm, the holder defines a receiving space and a pair of grooves, a pair of hooks is located at a first end of the tensioner arm, the hooks are received in the receiving space and are removably engaged in the grooves, the spring is received between the tensioner arm and the holder, and the belt tensioning pulley is mounted on a second end of the tensioner arm.

12. The display device of claim 11, wherein the second end of the tensioner arm defines a belt tensioning pulley shaft hole, and the belt tensioning pulley is mounted on a belt tensioning pulley shaft received in the belt tensioning pulley shaft hole.

13. A display device comprising:
a display housing;
a camera located on the display housing;
a bracket; and
a transmission unit connected between the camera and the bracket, the transmission unit comprising:
a camera rotation unit fixed on the display housing and connected with the camera;
a bracket rotation unit fixed on the display housing and rotatably connected with the bracket; and
a linkage unit interconnecting the camera rotation unit and the bracket rotation unit;
wherein when the display housing is rotated clockwise, the camera rotates a corresponding angle counterclockwise; and
when the display housing is rotated counterclockwise, the camera rotates a corresponding angle clockwise;
wherein the camera rotation unit comprises a supporter and a camera gear group, the supporter is fixed on the display housing, and the camera gear group interconnects the camera and the linkage unit; and
wherein the camera gear group comprises a toothed camera gear fixed to the camera and a transmission gear group, the supporter comprises a camera shaft dual hole and a transmission shaft hole, the toothed camera gear comprises a camera shaft received in the camera shaft dual hole, and the transmission gear group comprises a transmission shaft rotatably received in the transmission shaft hole.

14. The display device of claim 13, wherein the camera, the toothed camera gear and the camera shaft are fabricated as one whole body, the transmission gear group comprises a toothed first gear and a second gear, the toothed first gear and the second gear are mounted on the transmission shaft such that the toothed first gear and the second gear are rotatable synchronously, the toothed first gear is meshable with the toothed camera gear, and the second gear connects with the linkage unit.

15. The display device of claim 14, wherein the camera shaft dual hole comprises a smooth shaft hole and a damping shaft hole, the smooth shaft hole is located below and communicates with the damping shaft hole, and the camera shaft is selectively receivable in either the smooth shaft hole or the damping shaft hole; and when the camera shaft is received in the smooth shaft hole, the toothed camera gear meshes with the toothed first gear and the camera shaft is rotatable in the smooth shaft hole; and when the camera shaft is received in the damping shaft hole, the toothed camera gear is disengaged from the toothed first gear and the camera shaft is held in position in the damping shaft hole by friction.

16. The display device of claim 15, wherein when the camera shaft is received in the damping shaft hole, the camera shaft is rotatable in the damping shaft hole by applying external force on the camera to overcome the friction, and thereby an angle of the camera relative to the display housing is manually adjustable.

* * * * *